(12) United States Patent
Siegfriedsen

(10) Patent No.: US 8,366,582 B2
(45) Date of Patent: Feb. 5, 2013

(54) PLANETARY GEAR

(75) Inventor: Soenke Siegfriedsen, Rendsburg (DE)

(73) Assignee: Aerodyn Engineering, GmbH, Rendsburg (DE)

( * ) Notice: Subject to any disclaimer, the term of this patent is extended or adjusted under 35 U.S.C. 154(b) by 53 days.

(21) Appl. No.: 13/132,447

(22) PCT Filed: Nov. 5, 2009

(86) PCT No.: PCT/DE2009/001566
§ 371 (c)(1), (2), (4) Date: Jun. 2, 2011

(87) PCT Pub. No.: WO2010/072188
PCT Pub. Date: Jul. 1, 2010

(65) Prior Publication Data
US 2011/0243740 A1    Oct. 6, 2011

(30) Foreign Application Priority Data
Dec. 23, 2008  (DE) .......................... 10 2008 063 044

(51) Int. Cl.
*F16H 57/08* (2006.01)
(52) U.S. Cl. ..................................................... 475/346
(58) Field of Classification Search ............... 475/331, 475/346–348
See application file for complete search history.

(56) References Cited

U.S. PATENT DOCUMENTS

| | | | | |
|---|---|---|---|---|
| 3,513,715 A | * | 5/1970 | Whitfield | .......................... 74/410 |
| 5,344,370 A | * | 9/1994 | Luyckx | .......................... 475/319 |
| 5,540,630 A | * | 7/1996 | Vranish | .......................... 475/338 |
| 6,866,608 B2 | * | 3/2005 | Shirasawa | .......................... 475/331 |
| 2006/0052200 A1 | | 3/2006 | Flamang et al. | |
| 2008/0153657 A1 | | 6/2008 | Smook et al. | |

FOREIGN PATENT DOCUMENTS

| | | |
|---|---|---|
| DE | 10318945 | 10/2004 |
| EP | 1544504 | 6/2005 |
| WO | WO 02/14690 | 2/2002 |
| WO | WO 2008/113318 | 9/2008 |

* cited by examiner

*Primary Examiner* — Justin Holmes
*Assistant Examiner* — Huan Le
(74) *Attorney, Agent, or Firm* — Diederiks & Whitelaw, PLC

(57) ABSTRACT

A planetary gear including a stationary ring gear, a rotatable planet carrier having an even number of at least four mirror-symmetrically arranged planet wheels, and a sun gear and comprising two bearings disposed opposite of the sun gear and arranged between the planet wheels is provided. The bearings connect the input or output element of the planetary gear to the planet carrier in the center plane of the planet carrier, with the bearings forming an imaginary axis of symmetry, and at least two planet wheels having a lesser distance to each other than one of the planet wheels does to a further planet wheel.

6 Claims, 7 Drawing Sheets

PLANETARY GEAR

CROSS-REFERENCE TO RELATED APPLICATIONS

This application represents a National Stage application of PCT/DE2009/001566 entitled "Planetary Gear" filed Nov. 5, 2009, pending.

BACKGROUND OF THE INVENTION

1. Field of the Invention

The invention relates to a planetary gear with a stationary ring gear, a rotatable planet carrier having at least two planet wheels, and a sun gear.

The invention relates in particular to a gear for a wind power plant.

2. Discussion of the Prior Art

The trend that continues for wind power plants to construct relatively compact and light units leads to components installed in the wind power plants being exposed to increasingly larger deformations even in load-transmitting parts. In particular under dynamic loads, larger deformations above all of bearings and gear parts lead to locally excessive tensions that are partly inadmissibly strong in places, that again result in a marked reduction in the life of the components. For bearings and gear gears, a toothing offset or a trajectory deviation of the rolling elements of as little as 10 to 25 µm as a result of tilting due to external forces and moments can lead to an excessive load of such a magnitude that the components fail even after a very short time and thus lead to considerable financial damage.

On top of this, a wind power plant has an increased noise level due to the non-uniform engagement of the gear wheels into each other that is undesirable in particular in populated areas.

In particular for wind power plants of the 2.5 to 6 MW class, rotor bearings and ring gears of planet wheel have an outside diameter of approximately 2.5 to 3.5 m and widths of approximately 350 to 500 mm, the large teeth width leading to problems in terms of a uniform engagement of the toothing across the entire width of the teeth, in particular when outside loads act on this component. It is therefore necessary for the planet wheels to be able to give way to the deformation that is forced on them, above all tilting about the axes at right angles to the axis of rotation of the planet wheel, so that the teeth can engage as best as possible, that is to say uniform, across the tooth width in all load situations.

Due to the one-sided torque transmission via the planet wheel, the planet carrier is twisted. This leads to the axes of rotation of the planet wheel being shifted and thus to the tooth-engaging load to be less uniform across the entire tooth width, so that the gears can no longer transmit the forces in an evenly distributed manner. This leads to local excess loads and wear of the toothing that can be partly countered in the known planet wheels by tooth corrections.

As a further remedy, a planetary gear is for example known from DE 103 18 945 B3 where the planet axes are firmly connected to the gear wall and the planet wheels are mounted such on the planet axes that they tumble.

To mount the planet wheels, also the elements known from US 2008/0153657 A1 as "Flexpins" can be used.

However, this design of a planetary gear is also accompanied by increased assembly efforts despite increased manufacturing tolerances because each planet wheel has to be set up precisely and checked in terms of its functioning, i.e. its uniform engagement with the ring gear and the sun gear.

SUMMARY OF THE INVENTION

The object of the invention is therefore to provide a planetary gear where the probability of a non-uniform engagement of the gears and the noise level occurring on strong loads is reduced in comparison to the planet wheels known from the prior art, the intention being for it to be easier to manufacture and to assemble the planetary gear.

The basic idea of the invention is to apply the torque of the input or output element centrally to the planet carrier, in the center between the supporting discs. If the force is transmitted centrally from the rotor into the gear between the supporting discs of the planet carrier, twisting of the planet carrier is prevented. As a result, the inventive design of the planetary gear leads to a uniform contact pattern of the planet wheels.

BRIEF DESCRIPTION OF THE DRAWINGS

The invention is explained in more detail using a particularly preferred exemplary embodiment in terms of wind power plants and referring to the appended drawings. In the drawings.

DETAILED DESCRIPTION OF THE INVENTION

Figure 1:
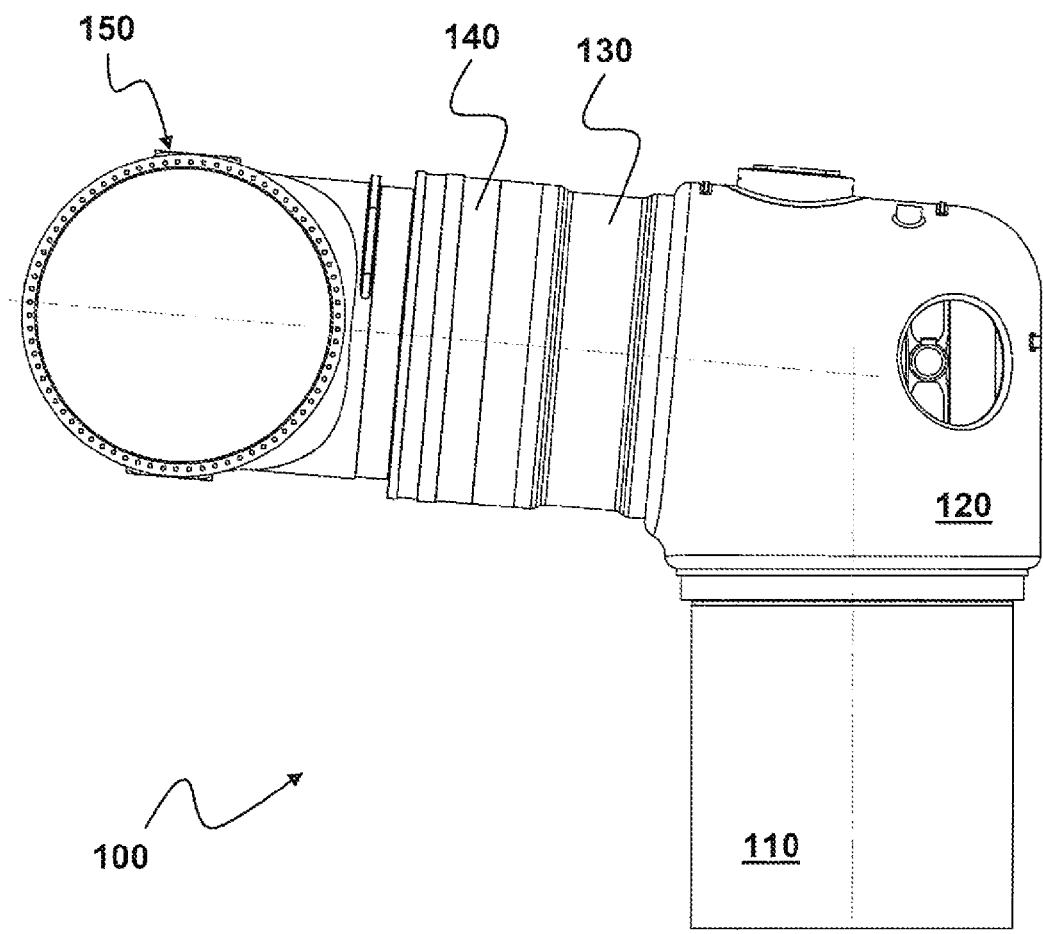
FIG. 1 shows a schematic side view of the nacelle, tower, and rotor of a wind power plant.

FIG. 1 shows a perspective view of a particularly compact design of a wind power plant. The wind power plant 100 exhibits a tower 110, a head support 120 arranged thereon and generator housing 130 connected thereto, gear housing 140 and a hub 150 attached thereto. The head support 120, the generator housing 130 and the gear housing 140 are preferably designed as load-transmitting components—as is known from WO 2008/113318 A2.

Figure 2:
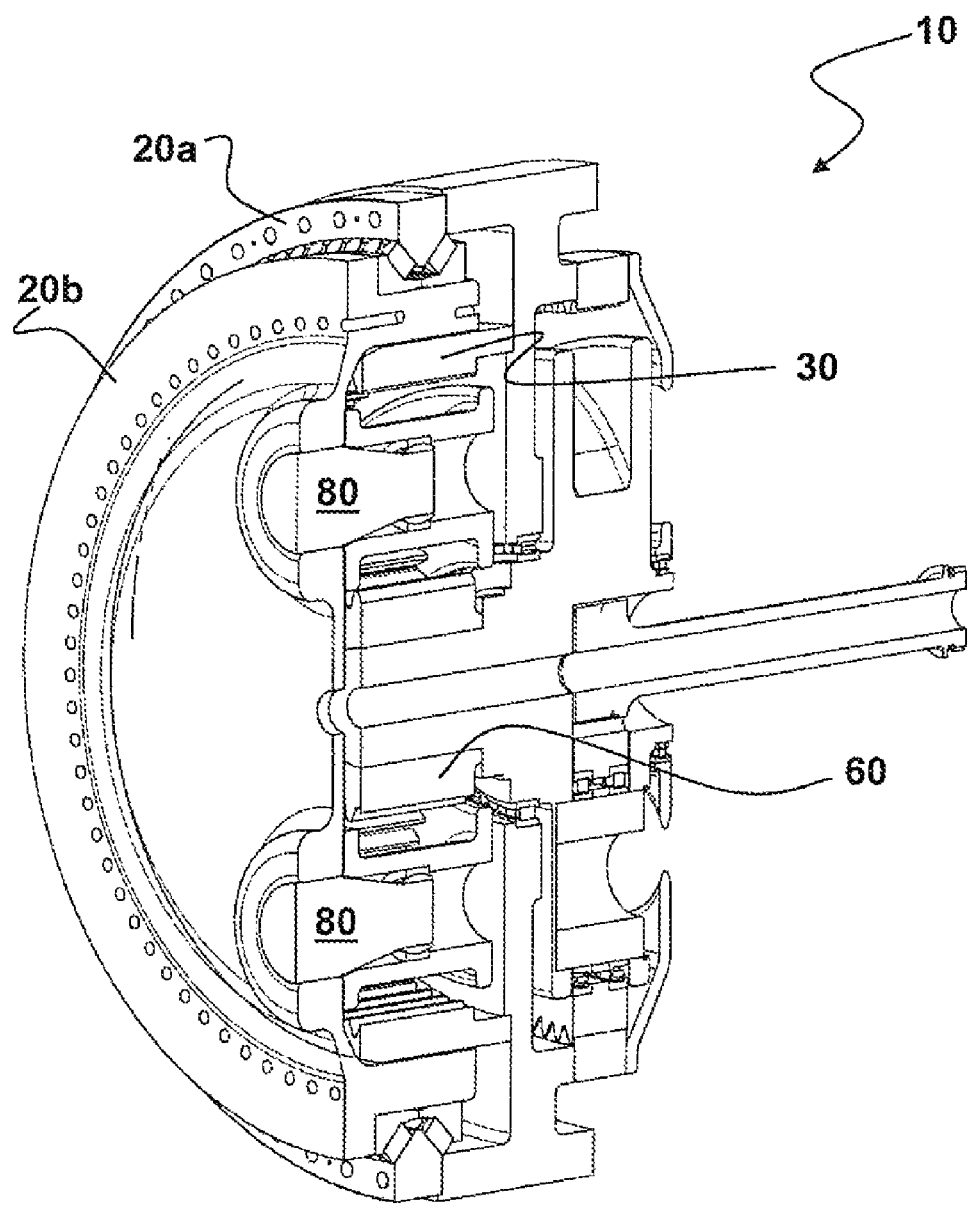
FIG. 2 shows a cut perspective view of the planetary gear according to the invention.
Figure 3:
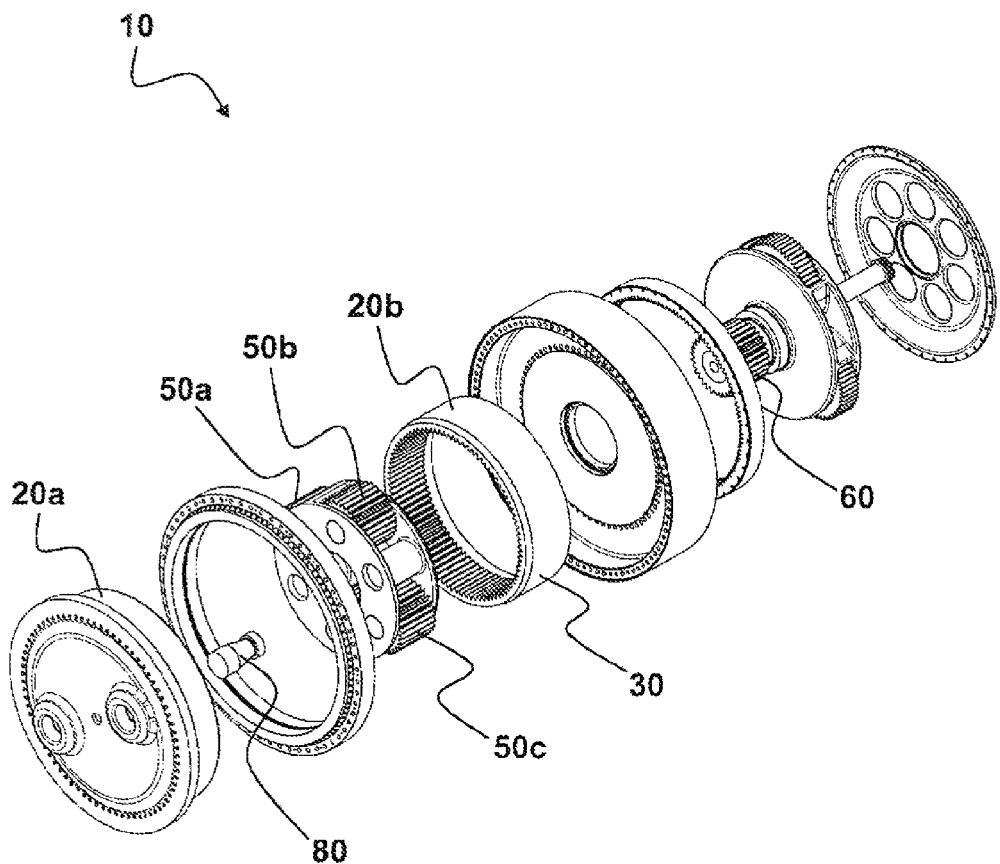
FIG. 3 shows an exploded view of the planetary gear of FIG. 2.

FIG. 2 shows a planetary gear according to the invention, installed in the gear housing 140 of the wind power plant 100 and of preferable design, in a perspective view, FIG. 3 showing the same exemplary embodiment in an exploded view. The planetary gear 10 has a rotor bearing 20 with an outside ring 20a and an inside ring 20b. Here the hub 150 of the wind power plant is connected to the inside ring 20b. The ring gear 30 of the planetary gear is firmly connected to the gear housing. Four planet wheels 50a, 50b, 50c, 50d are rotatably mounted on the planet wheel 40 by means of screws and engage towards the outside the stationary ring gear 30 and towards the inside the sun gear 60.

Figure 4:
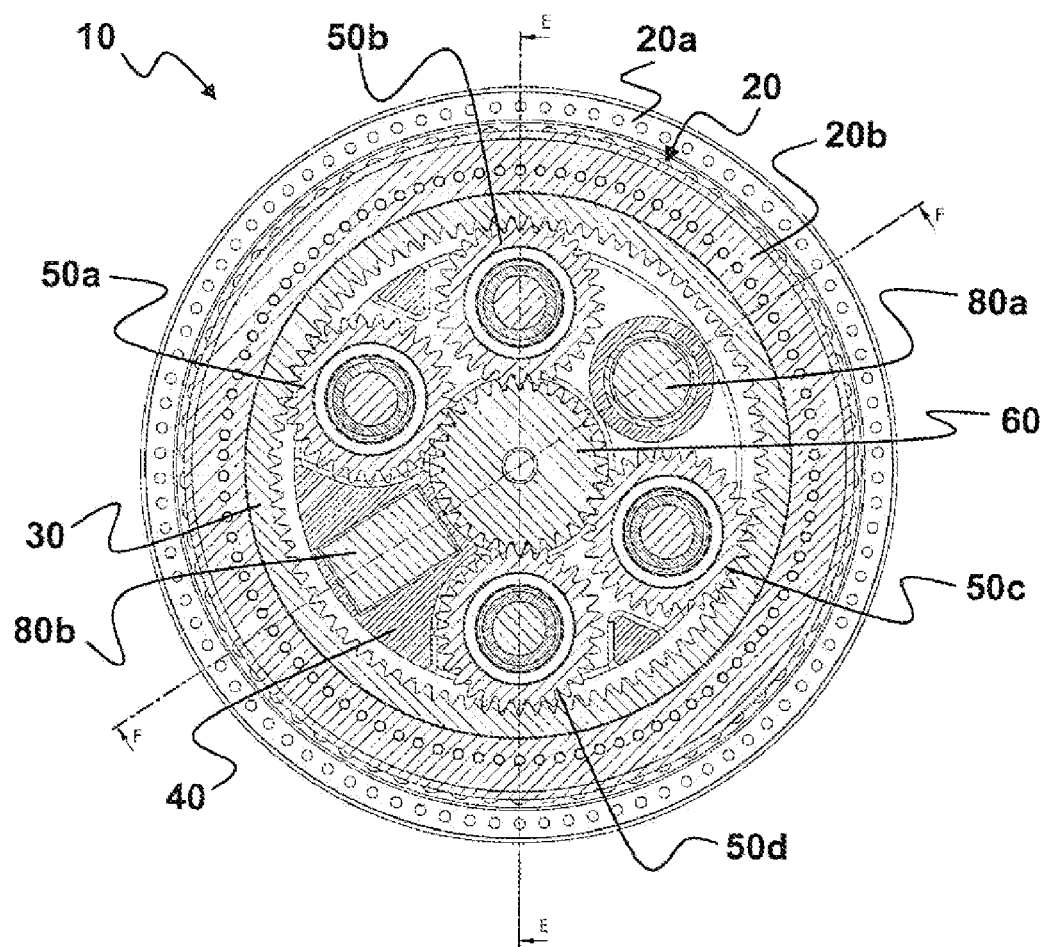
FIG. 4 shows a top view of the inventive planetary gear according to a particularly preferred exemplary embodiment.

To be seen is furthermore the bearing 80a, 80b, that is in each case illustrated as a cross-section of FIG. 4, that is designed, in the example shown, both as an elastomeric bushing 80b having a rectangular cross-section and also as a spherical plain bearing 80a, these two elements of the bearing 80a, 80b being arranged, lying on one axis, on the sides of the planet carrier 40 opposite the sun gear 60 between the planet wheels 50a and 50d or the planet wheels 50b and 50c. Of course, the plain bearings 80a and elastomeric bushings 80b can also be used as an alternative to each other.

The spherical plain bearing 80a is characterized by a high radial stiffness due to the large sliding surface and by low restoring moments when tilting due to the unimpeded rotatability. Use of the elastomeric bushings 80b is characterized by a slight radial correctability. Both bearing elements 80a, 80b permit the entire plant carrier to be tilted transversely to their axis of rotation, as a result of which they adjust to deformations without any problems without the components being subjected to larger component loads or without uneven tooth contact of the tooth engagements taking place with the disadvantages that have been described.

What catches the eye in FIG. 4 is that the planet wheels 50a, 50b, 50c, 50d are located on an imaginary circle, but are not distributed uniformly. It is rather to be seen that the distance between the planet wheels 50a and 50b or 50c and 50d is smaller than the distance between the planet wheels 50a and 50d or the planet wheels 50b and 50c. However, the planet wheels 50a, 50b and 50c, 50d are arranged mirror-symmetrically relative to each other, the axis on which the elements of the bearing 80a, 80b are arranged being the imaginary axis of symmetry.

This design is particularly advantageous in case the planetary gear is used for the power train of a wind power plant with a double-bladed rotor. In this case the inside ring 20b is directly connected to the hub of the double-bladed rotor and the bearing arrangement 80a, 80b is oriented at right angles to the axis of the rotor blades with the result that the forces acting on the screws of the planet wheels 50a, 50b, 50c, 50d and that have been introduced centrally from the rotor have as little influence as possible on the toothing of the planets 50a, 50b, 50c, 50d with the ring gear 30 or the sun gear 60 and even tooth engagement being guaranteed.

Figure 5:
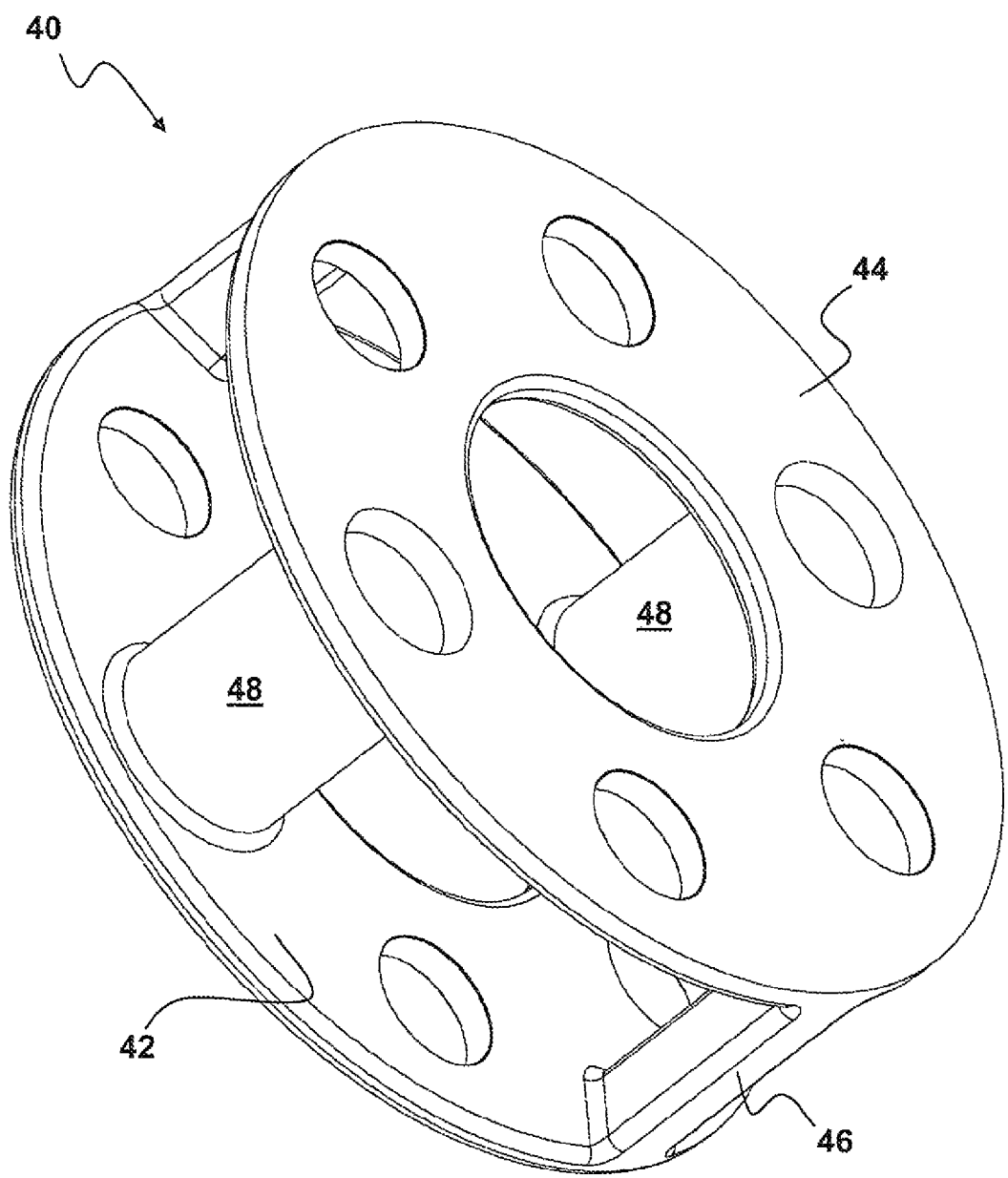
FIG. 5 shows a perspective view of the planet carrier.

FIG. 5 shows the planet carrier 40 of the inventive planetary gear 10. The planet carrier exhibits a rear and a front supporting disc 42, 44 that are interconnected by means of connecting elements 46, 48. It is now essential for the invention that in the exemplary embodiment that has been shown two connecting elements 48 are designed as receptacles for the screws 80 that connect the input or the output element of the gear to the planet carrier, the forces being introduced centrally into the receptacles 48 between the supporting discs 42, 44.

Figure 6:
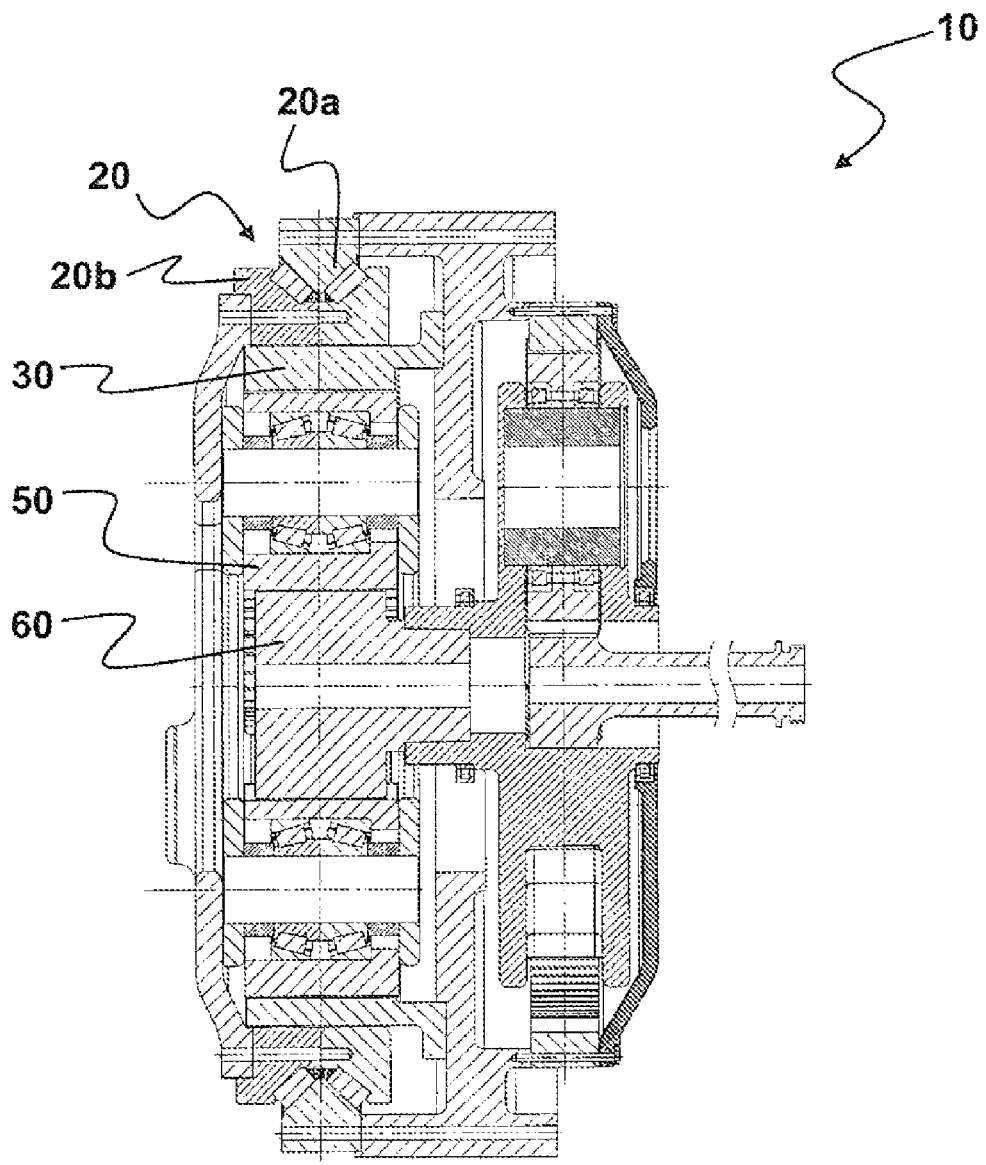
FIG. 6 shows a section through the planetary gear of FIG. 4 along the line E-E.

FIG. 6 shows the constructive relationships that are essentially known of the inventive planetary gear 10 of FIG. 4 along line E-E in cross-section. The rotor bearing 20 consisting of the outside ring 20a and inside ring 20b can be seen clearly, the hub 150 being firmly connected to the inside ring 20b of the rotor bearing 20. Arranged next to it are the planet wheels 50 that are mounted on the planet screws, and the sun gear 60.

The planetary gear 10 that is shown here is designed as a two-stage planetary gear. However, it is obvious for the person skilled in the art that according to the invention also single-stage or multi-stage planet wheel can be designed in addition to a two-stage planetary gear.

Figure 7:
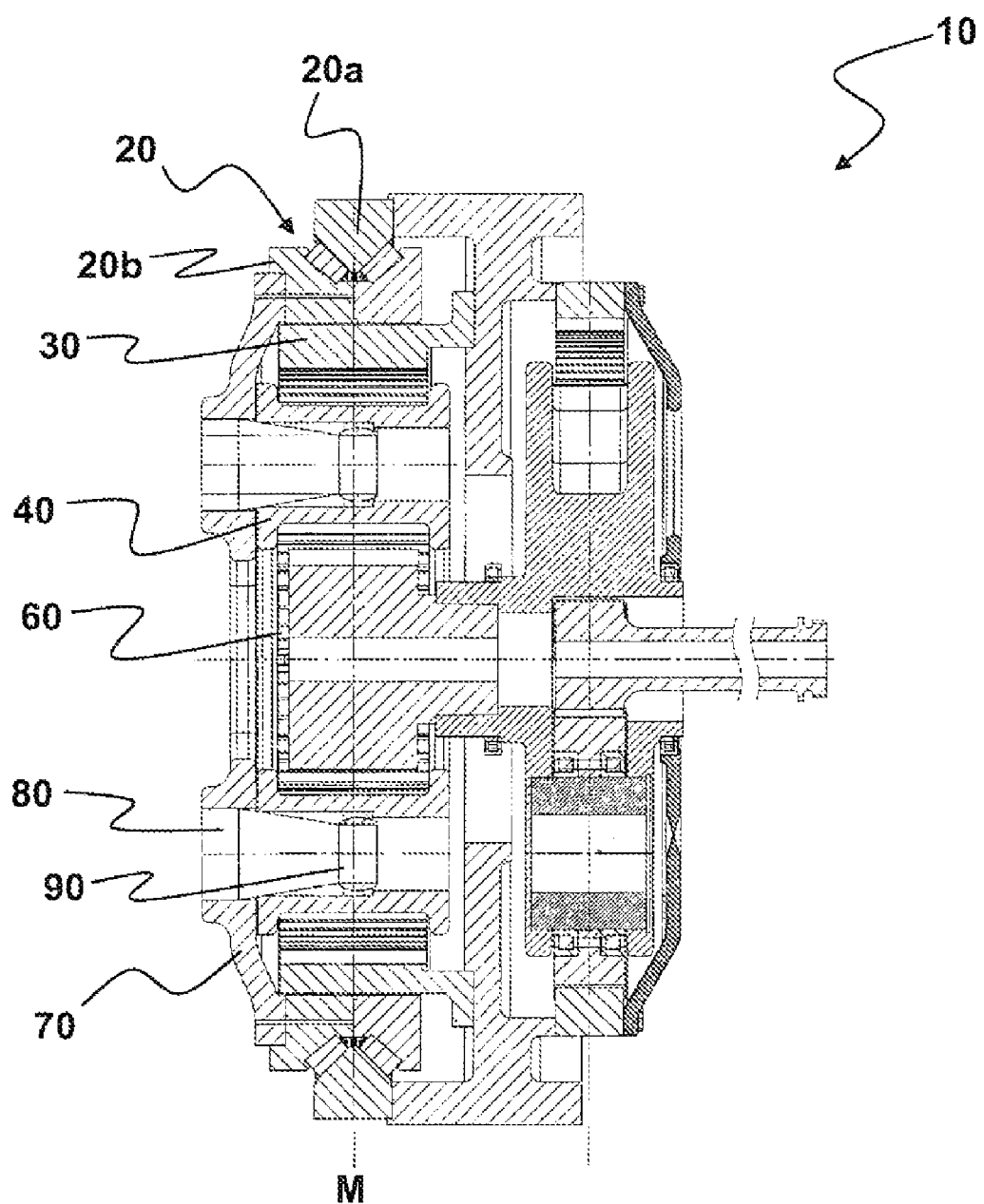
FIG. 7 shows a section through the planetary gear of FIG. 4 along the line F-F in a slight modification.

According to the invention it is in particular provided, as is shown in FIG. 7 in cross-section, that the hub 150 is connected to the inside ring 20b and via the connecting element 70 to the planet carrier 40. This takes place for example by means of the spherical plain bearing 80a shown in FIG. 4, or the elastomeric bushing 80b (deviating therefrom, FIG. 2 shows two spherical plain bearings 80).

It can be seen clearly in this context that the hub 150 as input element of the generator 10 is connected via the connecting element 70 and the screws 80 in the center plane M of the planet carrier 40 thereto so that the torque can be introduced distributed as evenly as possible into the planet carrier 40. It can be gathered in particular from FIG. 7 that especially the pivot heads 90 of the screws 80 that connect the connecting element 70 directly to the planet carrier 40 and thus indirectly the hub 150 to the planet carrier 40, are arranged in the center plane M, that is to say centrally between the supporting discs 42, 44 of the planet carrier 40.

It is obvious that the planet carrier 40 can be connected to a input element, in the example shown the hub 150 of a wind power plant 100. In other cases, the inventive planetary gear 10 can also have such a design and be tied in functionally so that an output element is connected to the planet carrier.

It is further obvious that the input or output element can be connected directly or indirectly by means of further structures, for example the connecting element 70, to the planet carrier. It is here essential that the force transmission between input element and planet carrier or planet carrier and output element takes place centrally in the center plane of the planet carrier.

The invention claimed is:

1. A planetary gear with a stationary ring gear, a rotatable planet carrier that exhibits an even number of at least four mirror-symmetrically arranged planet wheels, and a sun gear comprising:
   two bearings disposed opposite of the sun gear and arranged between the planet wheels, said bearings connecting an input or output element of the planetary gear to the planet carrier in a center plane of the planet carrier, wherein the bearings form an imaginary axis of symmetry, and
   at least two of said planet wheels have a lesser distance to each other than one of said two of said planet wheels does to a further one of said planet wheels.

2. The planetary gear according to claim 1, characterized in that the connection of input or output element with the planet carrier is designed as a tumble bearing.

3. The planetary gear according to claim 1, characterized in that the input or output element is connected to the planet carrier by means of screws.

4. The planetary gear according to claim 3, characterized in that at least one of said two bearings is designed as a spherical plain bearing.

5. The planetary gear according to claim 3, characterized in that at least one of said two bearings is designed as an elastomeric bushing.

6. A wind power plant comprising:
   a double-bladed rotor; and
   a planetary gear with a stationary ring gear, a rotatable planet carrier that exhibits an even number of at least four mirror-symmetrically arranged planet wheels, and a sun gear;
   two bearings disposed opposite of the sun gear and arranged between the planet wheels, said bearings connecting an input or output element of the planetary gear to the planet carrier in a center plane of the planet carrier, wherein the bearings form an imaginary axis of symmetry, and
   at least two of said planet wheels have a lesser distance to each other than one of said two of said planet wheels does to a further one of said planet wheel, the double-bladed rotor having a hub being connected to the planet carrier and the axis of symmetry formed by the bearings is oriented at right angles to an axis of blades of the rotor.

* * * * *